Sept. 24, 1929.   C. F. HEMENWAY   1,729,216
OUTING KIT
Filed Dec. 30, 1925   2 Sheets-Sheet 1

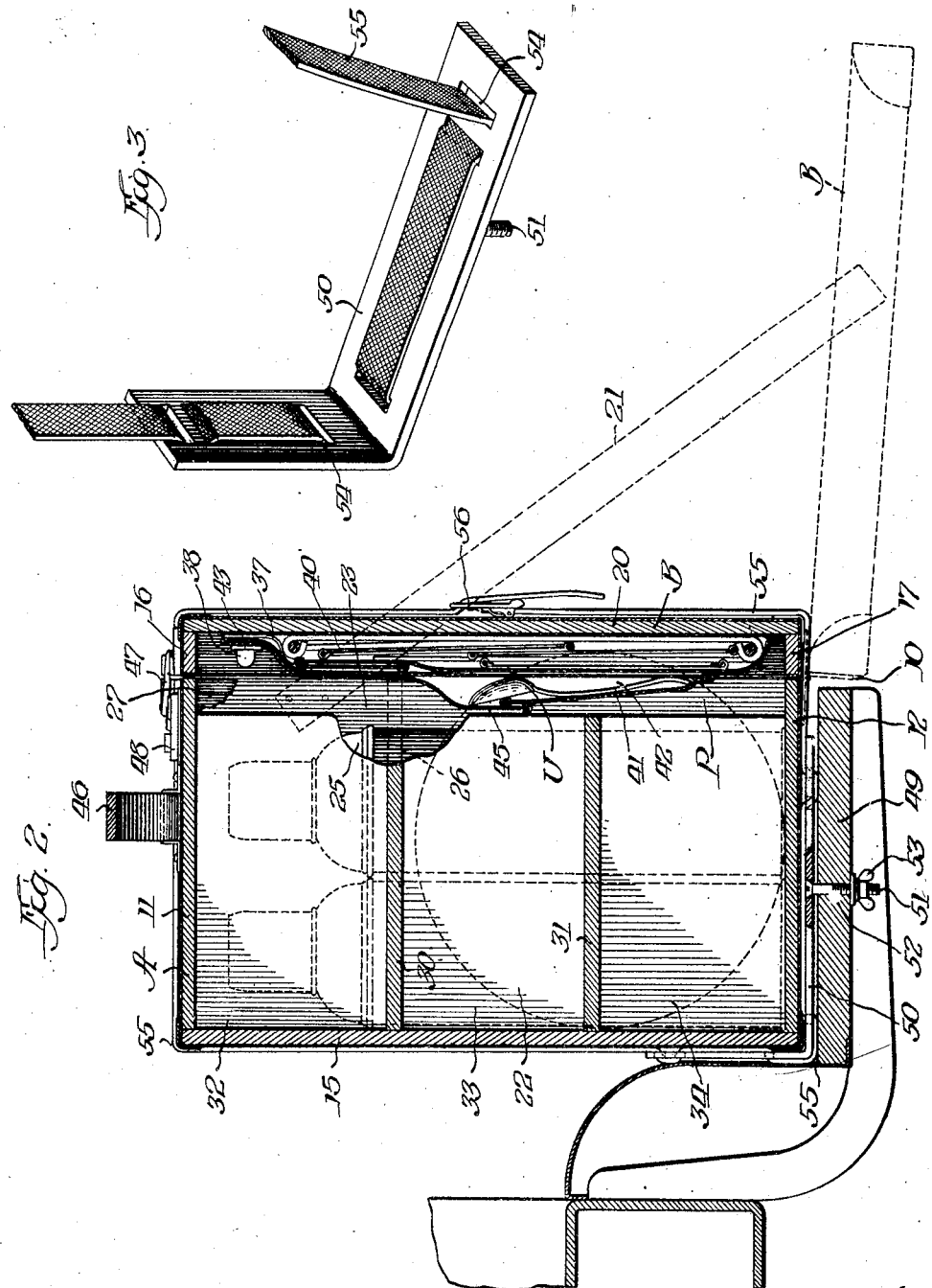

Patented Sept. 24, 1929

1,729,216

UNITED STATES PATENT OFFICE

CHARLES F. HEMENWAY, OF CHICAGO, ILLINOIS

OUTING KIT

Application filed December 30, 1925. Serial No. 78,269.

This invention relates to outing kits comprising a container having compartments and containing food holders, and cooking and eating utensils.

Although my improved kit is adapted for general outing purposes, it has been constructed and designed more especially as an automobile accessory to be conveniently carried on the automobile running board. The main object of the invention is to provide an arrangement of walls, supports and compartments which will give maximum capacity and will permit the food, food containers and various utensils to be compactly arranged, firmly supported, and readily accessible. At the same time the object is to keep the kit to such shape and weight that it can be readily carried by a single person.

Referring to the drawings:—

Fig. 2 is a sectional view on plane 2—2, Fig. 1, with the cover in closed position; and Fig. 3 is a perspective view of one of the brackets for supporting the kit on the running board of an automobile.

Figure 1:
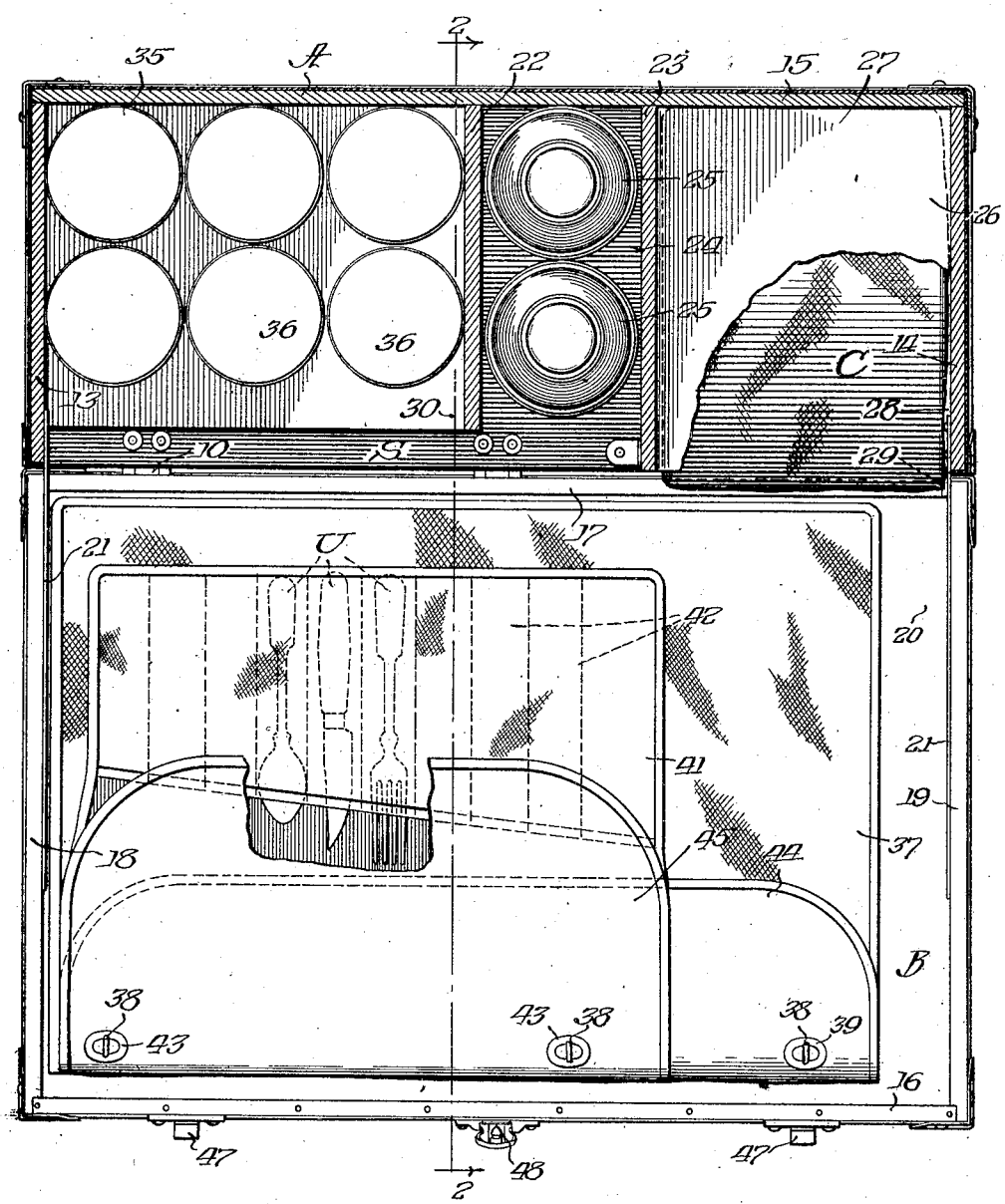
Figure 1 is a plan view of the kit with the cover swung to open position and the top of the container body removed.

The kit container comprises the body part A, for whose open front side is provided the cover part B hinged along its lower end to the body part by suitable hinges 10. The body part comprises the upper and lower walls 11 and 12, the side walls 13 and 14, and the rear wall 15. The cover part is comparatively shallow and comprises the top and bottom walls 16 and 17, the side walls 18 and 19, and the outer wall 20. The hinges 10 referred to extend between the bottom walls of the body and cover part, respectively, so that when the body part is vertical, the cover part may be swung down to horizontal position, in which position it will be held by check straps 21 secured at their ends to the side walls of the body and cover part, respectively.

Extending between the upper and lower walls of the body part are the vertical partition walls 22 and 23 which form the compartment 24 for receiving the vacuum bottles 25, two such bottles of standard one quart size being shown arranged in a transverse row within the compartment, one for hot liquids and one for cold liquids. The vacuum bottles control the vertical height of the entire box. A standard vacuum bottle one quart size is approximately fourteen inches high and slightly less than four inches in diameter. The compartment 24 is approximately fifteen inches high by four inches wide. The wall 23 extends the full depth of the body part from the front edge of the upper and lower walls thereof to the rear walls, and between this wall and the adjacent side wall 14 and a distance approximately four and one-half inches downwardly from the top of the body part is the horizontal partition 26 which, with the wall 23 and the adjacent walls of the body part, forms the upper and lower compartments 27 and 28. The lower compartment 28 is shown accommodating a cylindrical package C which may be a number of internested cooking utensils (not shown) protected by a covering or bag 29. It is the diameter of this cooking utensil set which controls the horizontal thickness of the entire cabinet. The utensil kit which I have selected employs for the largest container a nine inch diameter cooking pot, approximately six and three quarters inches high. With the canvas cover over the same this kit is slightly larger and I, therefore, make the horizontal distance between partition 23 and the side wall of the box approximately seven and one-half inches to receive the kit snugly. The compartment 28 is approximately ten inches high, as a certain amount of space is required to clear the bail and to include the cover or bag 29. The upper compartment 27 may contain food, food containers, paraphernalia such as towels and dish cloths, or other material or articles.

Between the vertical partition wall 22, the adjacent side wall 13 of the body part, and the rear wall of the body part extend the horizontal partitions 30 and 31 forming compartments 32, 33 and 34. The upper compartment 32 is preferably made of a size to snugly receive one or more loaves of bread of standard size. The horizontal depth of the compartment is substantially the length of a loaf of bread and the height of the vertical height is controlled by the height of a loaf of bread. A large size standard loaf is approximately 4½" high and 9" long.

The length of compartment 32 is controlled in the present case by the length of the grid or stove 40, but where the length of the grid does not control, then the compartment may be shortened up by one or more units represented by the width of a jar 36. The compartment is approximately eleven inches long by four and seven-eighths inches high and eight inches deep. The compartments 33 and 34 are approximately four and one-half inches high. In the middle compartment 33, or the lower compartment 34, or in both, cans 35 of food may be stored, or jars 36 for containing loose condiments, food or other materials. The dimensions of the compartments are preferably such that the jars, cans or materials will fit snugly without unnecessary play so as to prevent rattling and breakage. The height of compartments 33 and 34 is controlled by the height of the standard three and one-half inch jars 36 and the standard large size tin cans. The jars are preferably of the wide mouth type with screw tops so that easy access may be had to the contents. The jars 36 are three and one-half inches in diameter by four and one-half inches high.

I also use the cover or closure structure B as a support for various articles. As shown, a rectangular bag 37 of canvas or other suitable material is detachably suspended on the outer wall 20 of the cover part. This bag is approximately thirteen and three quarters inches high by twenty-one inches wide. Suitable fittings may be utilized for such suspension. As shown, I have provided turn buttons 38 on the wall 20 for receiving grommets 39 on the bag. The bag may contain a folding stove or grid structure 40 which can fold flatly and compactly into rectangular shape. The folding stove which I employ is approximately twelve and one quarter inches high by twenty inches wide and one and one-half inches thick.

I have also shown a smaller bag 41 subdivided to form compartments 42 for utensils U such as knives, spoons, forks, can openers, cork screws, etc. This bag is approximately fifteen and one-half inches wide and twelve and one-quarter inches high. Along its upper edge the bag 41 has grommets 43 which may receive some of the turn buttons 38 so that the bag will be supported on such buttons in common with the bag 37. The contents of the bags are protected by flaps 44 and 45, respectively. The partitions 22, 30 and 31 are cut back to provide the necessary space for the tool or utensil kit. If the stove or grid is omitted, then the kit of tools or utensils may be disposed wholly within the cover B. When the kit is to be used, the cover or closure part B is swung down to horizontal position and all the contents of the various compartments of the body part will be exposed and accessible. By swinging open the flap 45 the contents of the bag 41 are exposed and accessible and when the bag 41 is swung out of the cover part or is detached therefrom the flap 44 of the bag 37 may be thrown back or the entire bag may be removed from the cover structure, so that the stove structure can be withdrawn. When the container is closed the bags will hang suspended from the supporting buttons and the contents will be compactly held and will not bump together or rattle.

The combined thickness of the two bags and their contents may be in excess of the depth of the cover or closure part B, which is about one inch. To accommodate for this, I provide clearance space S within the body part by terminating the wall 22 and the partitions 30 and 31 a distance of about one inch short of the front edges of the upper and lower walls of the body part. When the container is closed the bags will hang in front of the various compartments within the body part and will yieldably hold the contents within such compartment and prevent displacement or rattling thereof. A handle 46 is provided for the container, likewise latch mechanism 47 and a lock 48. A suitable oil cloth cover may be disposed over the box to render it substantially waterproof, as is now done with automobile trunks.

These kits may be conveniently supported on the running board 49 of an automobile and for this purpose I preferably provide two bracket structures 50. Each bracket structure is formed of a bar of metal bent to L-shape and the horizontal member thereof provided with a threaded stud 51 for extending through a hole 52 in the running board and to be secured by a wing nut 53. Each bracket structure has slots 54 therethrough through which a strap 55 is threaded, the strap passing entirely around the kit and being secured by buckles 56. By threading the strap through the bracket structures as shown, sections of the straps will be on opposite sides of the bracket walls to be interposed between the metal of the bracket and the kit and the automobile walls in order to prevent chafing or scratching of such walls. Before starting a trip, the bracket structures can be easily and accurately applied to the running board by means of the studs and the wing nuts, and then when the kit container is set on the brackets, the straps are passed around the container and tightened by means of the buckles so that the kit will be securely held to the running board. When the kit is to be used the straps are undone and the kit may remain on the running board or be set on the ground.

I thus produce a practical, compact, convenient and useful outing kit which can be readily transported on the running board of an automobile or carried or transported like a traveling case or trunk. The case or kit is about 24" long by 15¾" high by 11" deep. I do not desire to be limited to precisely what I have shown or described, nor to the dimensions given, as they are merely explanatory, as modifications can be made which will still come within the scope of the invention, which I claim as follows:—

1. In an outing kit, a container including a body open at one side and a closure member therefor hinged at its lower edge to the lower edge of the open side of the body, partition members dividing the interior of the body into compartments opening outwardly of the body at the open side thereof, and a bag of soft flexible material carried by the closure member and forming a cushioning closure for certain of the compartments when the closure member is in closed position.

2. In an outing kit, a container including a body open at one side and a relatively shallow closure member hinged to the open side of the body, the depth of the body from the open side thereof being less than the outside diameter of a kit of cooking pans and the distance between the closure member and the back wall of the body being substantially equal to such diameter, partition members forming with the walls of the body a plurality of compartments, certain of said compartments being multiple units of food containers of standard sizes, certain other compartments being multiple units of articles of food of standard sizes, the height of one of the compartments being substantially the same as the outside diameter of the kit of pans, a bag for a grid suspended within the closure member from the upper portion thereof and extending across the greater portion of said one compartment, and a bag for culinary articles suspended within the closure member inwardly of the first bag and having its inner end disposed short of the inner side of said one compartment, certain of the partition members being reduced in width to accommodate said second bag.

3. In an outing kit, a container including a body open at one side and a relatively shallow closure member hinged to the open side of the body, the depth of the body from the open side thereof being less than the outside diameter of a kit of cooking pans and the distance between the closure member and the back wall of the body being substantially equal to such diameter, and partition members forming with the walls of the body a plurality of compartments, the height of one of the compartments being substantially equal to the outside diameter of the kin of pans, the kit of pans when placed in said compartment projecting beyond the body at the open side thereof.

In witness whereof, I hereunto subscribe my name this 24th day of December, 1925.

CHARLES F. HEMENWAY.